March 16, 1937.    E. J. VON PEIN    2,074,006
SCALE CONTROLLED RECORDER
Filed Dec. 30, 1933    3 Sheets-Sheet 1

INVENTOR
Edward J. Von Pein
BY
[signature]
ATTORNEY

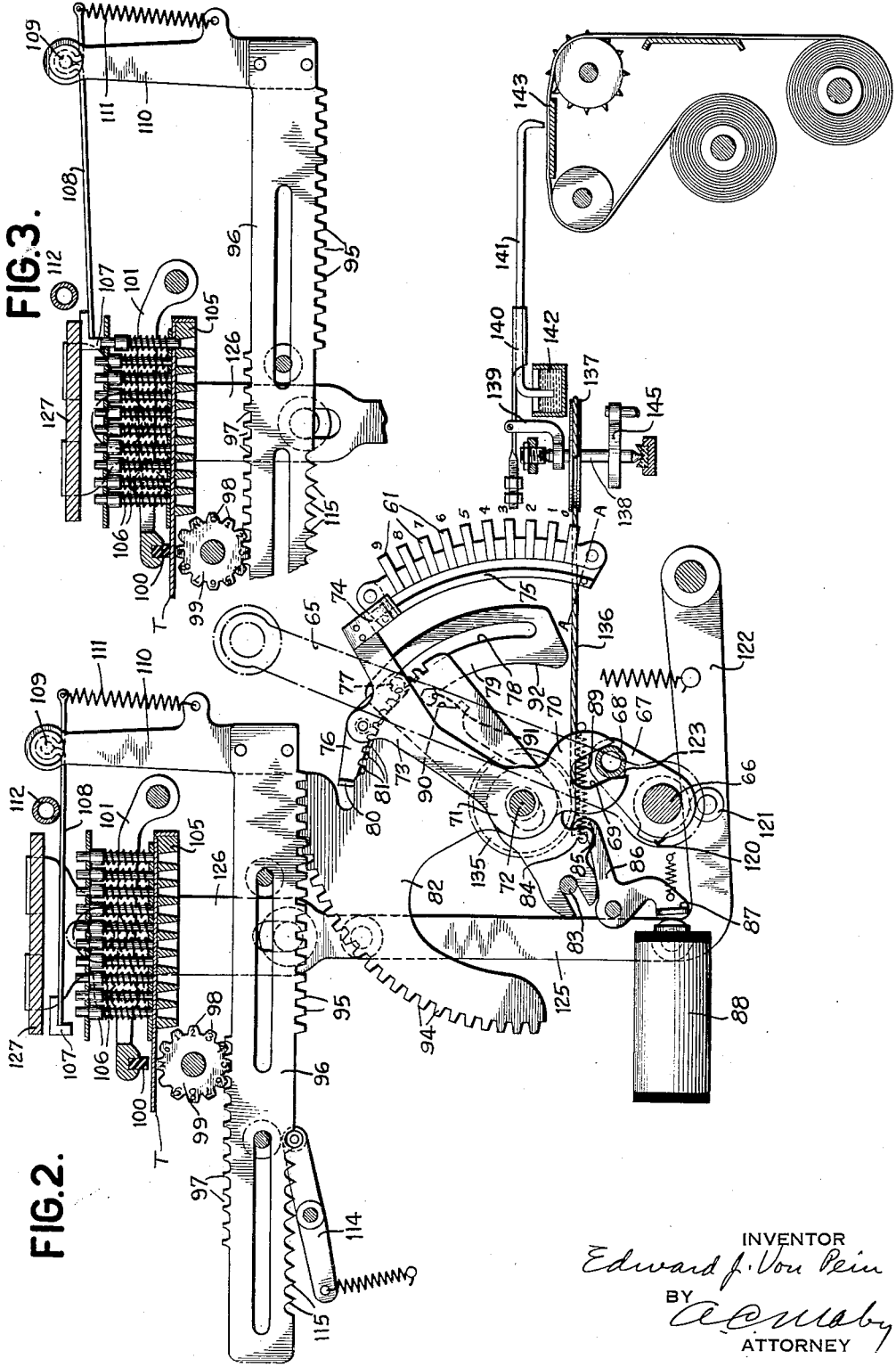

March 16, 1937.　　　　E. J. VON PEIN　　　　2,074,006
SCALE CONTROLLED RECORDER
Filed Dec. 30, 1933　　　3 Sheets-Sheet 3
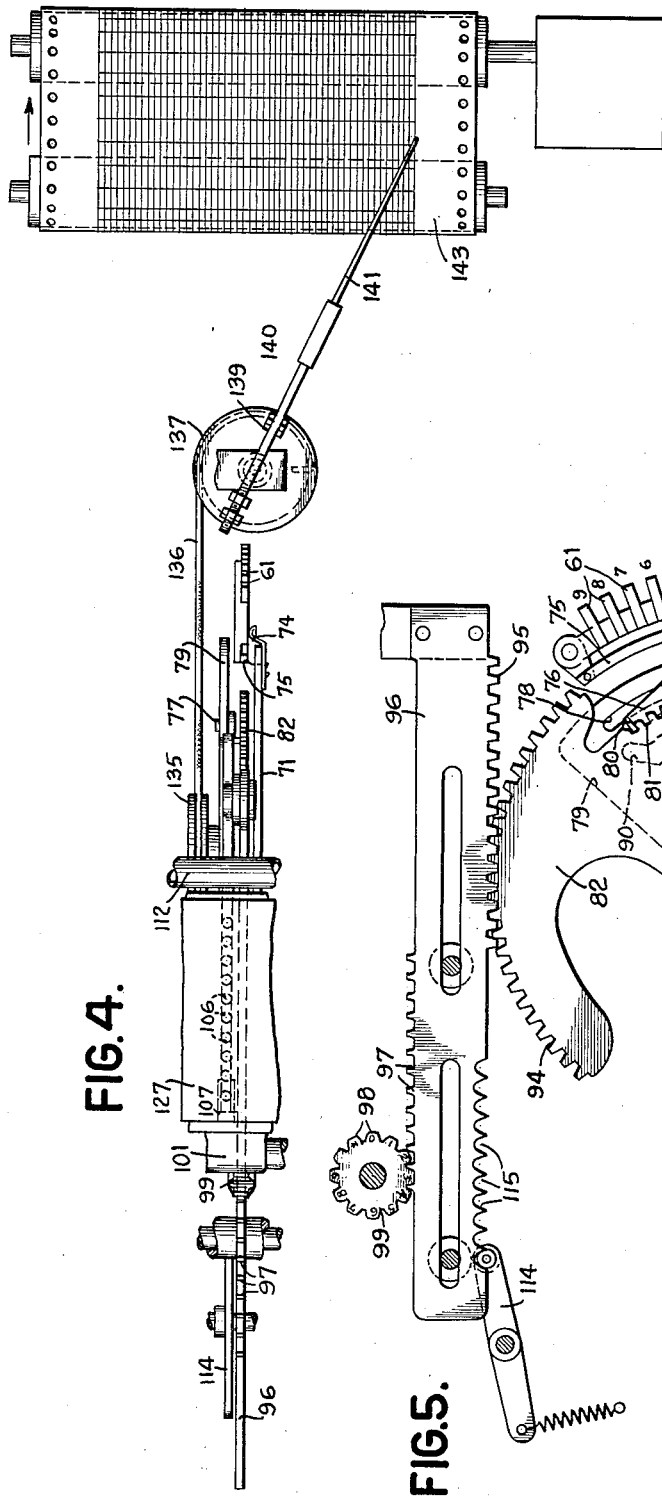
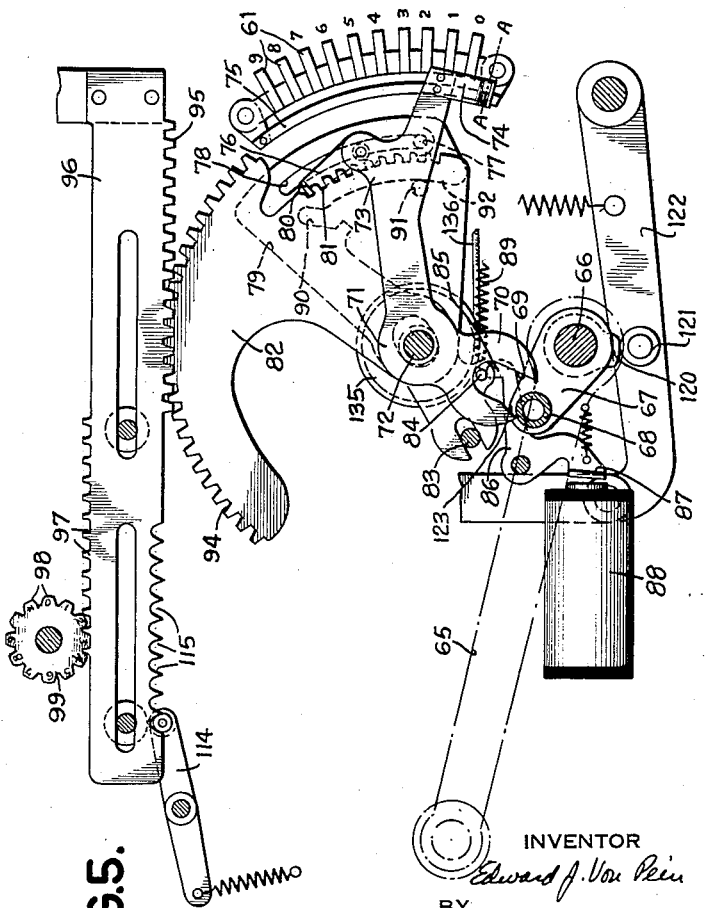
INVENTOR
Edward J. Von Pein
BY
A. C. Maby
ATTORNEY Patented Mar. 16, 1937

2,074,006

UNITED STATES PATENT OFFICE 2,074,006

SCALE CONTROLLED RECORDER

Edward J. Von Pein, Dayton, Ohio, assignor to International Business Machines Corporation, New York, N. Y., a corporation of New York Application December 30, 1933, Serial No. 704,783

5 Claims. (Cl. 235—61)

This case relates to a combination weighing scale and weight recorder.

The object is to provide novel means for controlling operation of a recorder by the scale.

A further object is to mechanically operate a graphic recorder under remote control of a scale.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 2 is a side view of the recorder.

Fig. 3 is a side view of the digit recorder in operated position.

Fig. 4 is a plan view of one of the recording units.

Fig. 5 is a side view of part of the recorder in operated position, and

Fig. 6 is a detail of the printing hammer and its operating means.

Figure 1:
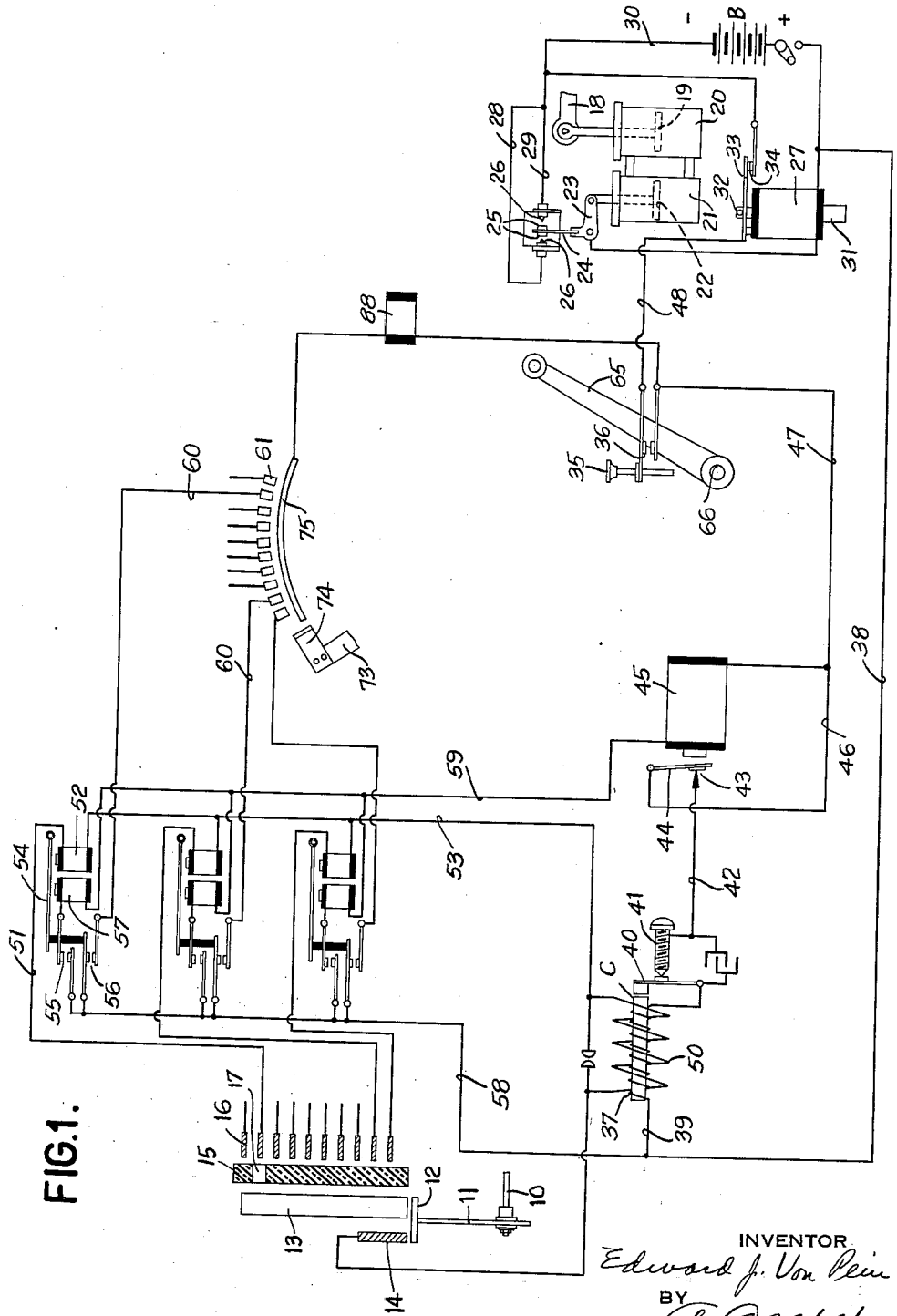
Fig. 1 is a schematic and circuit diagram of the scale and intercontrol between the scale and recorder.

For the purposes of the disclosure, the invention is herein described in its application to the scale disclosed in Patent No. 1,914,388.

In brief, the scale, when load is applied, rotates a shaft 10 in accordance with the load. Shaft 10 carries an arm 11 provided with a conductive strip 12 which moves in a circular path lying within and slightly separated from the inner circular terminals of radial conductive bars 13 and the inner circumference of conductive ring 14. There is one bar 13 at each unit load or pound point of the path of strip 12. Behind bars 13 is a perforated mica disk 15 covering circular bands 16 corresponding, in one denominational order, to the digits of the order. Mica disk 15 has perforations 17 selectively exposing the bands 16 to cooperate with bars 13 for translating the load. Assume that the load on the scale is 9 pounds. The shaft 10 will move the strip 12 into radial alinement with a bar 13 at the 9 pound load point. This bar 13 is in front of a perforation 17 which exposes the band 16 corresponding to 9 in the units order of the recorder. When a high tension spark is jumped from common ring 14 to strip 12, the latter is electrically charged to in turn jump a spark to radial bar 13 at the 9 pound position. The bar 13 in turn jumps a spark through a perforation 17 to charge the conductive band 16 corresponding to 9 in the units order of the recorder.

The high tension circuit for forming the sparks to bridge the gaps in the chain of conductive elements above described, is formed only when the scale comes to rest under a load, as follows: The scale when load is applied, sets a beam 18 in motion to move a plunger 19 in a main dash pot 20 connected to a smaller auxiliary dash pot 21 in which a light plunger 22 is movable.

When plunger 19 is moved in dash pot 20, the liquid in the dash pots 20 and 21 surges to vibrate the plunger 22. The latter plunger oscillates a lever 23 having a spring strip 24 with contact points 25 between fixed contact points 26. Engagement of either of points 25 with either of points 26 closes a circuit through a solenoid 27. This circuit is from the + side of battery B through solenoid 27, strip 24, a contact point 25, a contact point 26, line 28 or 29, and line 30 to the — side of battery B.

Solenoid 27 being energized lifts core 31 to release a pin 32 thereon from the spring blade 33, thus separating contacts 34. As long as these contacts are separated, the high tension circuit for charging one of bands 16 is not formed. When the scale comes to rest, the beam 18 stops moving, plunger 19 comes to rest, the liquid in the dash pot stops surging and plunger 22 with strip 24 stops oscillating. Contacts 25 then take a position spaced from contacts 26 and the circuit through solenoid 27 opens, permitting core 31 to descend and its pin 32 to close contacts 34. Now, if the operator depresses push button 35 to close contacts 36, a circuit is formed through the primary 37 of an induction coil C, as follows: From the + side of battery B through lines 38 and 39, primary 37, vibrator 40, screw 41, line 42, contacts 43 (one of which is on the armature 44 of a magnet 45), through lines 46, 47, contacts 36, line 48, contacts 34, and line 30 to the — side of battery B.

Primary 37 being energized, the action of vibrator 40 causes a high potential to be induced in secondary 50 of the induction coil. One side of the secondary 50 is connected to common ring 14 to charge the latter and cause sparks to jump from ring 14 to strip 12, from strip 12 to bar 13 in radial alinement, and from bar 13 through perforation 17 to the conductive band 16.

The charge on band 16 is transmitted by line 51 to an associated high tension magnet 52 from which a return lead 53 is directed to the opposite side of the secondary 50.

As soon as high tension magnet 52 is energized, it attracts armature 54 to close an upper pair of contacts 55 and a lower pair of contacts 56. Closing of the upper pair of contacts 55 establishes a circuit through magnet 45 to attract armature 44 and open contacts 43, thereby breaking the circuit through the induction coil. In series in the circuit formed through magnet 45 is also a low tension magnet 57 to which armature 54 is common so that energization of magnet 57 holds armature 54 depressed to maintain contacts 55 and contacts 56 closed. The circuit through magnets 45 and 57 is as follows: From the + side of battery B through lines 38, 58, upper contacts 55, the magnet 57 in series with these contacts, line 59, magnet 45, line 47, contacts 36, line 48, contacts 34, and line 30 to the − side of the battery.

The armature 54 being held down by the energized magnet 57, the lower pair of contacts 56 remains closed. Each pair of contacts 56 is connected in series by a line 60 with that one of the contact points 61 of the recorder corresponding to the same digit in the same order as the one containing contacts 56.

At the completion of the selection period by the scale, for a multi-denominational order load, there will be a pair of contacts 56 closed corresponding to the digit of the load in each of the orders. Correspondingly, in each order of the recorder, that one of the contact points 61 will be in series with a closed pair of contacts 56 corresponding to the digit of the load in the same order. These selected contact points 61 are thus live spots potentially capable of exercising control over the recorder operation which will be described below.

For convenience, only one order is shown, it being understood that the operation of the other orders is similar to the one illustrated.

Referring to Fig. 2, the recorder includes a rockable operating handle 65 fast to shaft 66 having crank arm 67 with a crank pin 68 coacting with slot 69 in the arm 70 of a lever 71 to rock the lever 71 clockwise, when the handle 65 is pulled toward the left (as viewed in Fig. 2). Lever 71 is freely pivoted on shaft 72 and has an upper arm 73 which at its outer end rigidly supports through insulation a feeler 74 successively connecting contact points 61 to a common conductive bar 75. The arm 73 also pivotally carries a pawl 76 having at its tail end a pin 77 which moves within a slot 78 formed concentrically of shaft 72 in a member 79. When member 79 is in the position shown in Fig. 2, pin 77 is held by slot 78 in a manner to retain the pawl nose 80 of pawl 76 clear of teeth 81 in a rack segment 82 freely pivoted on shaft 72.

Member 79 is constrained to slidable movement by shaft 72 and fixed rod 83. Normally, member 79 is retained in position shown in Fig. 2 by engagement of a pin 84 thereon with the nose 85 of a pivoted pawl 86. This pawl has an armature 87 which is in coaction with a magnet 88. The magnet is energized when feeler 74 of lever 71 engages the live contact point 61 in series with the closed pair of contacts 56, selection of which by the scale has already been described. The circuit through magnet 88 is as follows, referring to Fig. 1:

From the + side of battery B, through lines 38, 58, closed contacts 56, line 60, the serially connected live contact point 61, feeler 74, common bar 75, magnet 88, push button contacts 36, line 48, contacts 34, and line 30 to the − side of the battery.

When magnet 88 is energized, it rocks pawl 86 clockwise, releasing pin 84 and permitting a spring 89 to shift member 79 to its outer position shown in Fig. 5. In moving to the outer position, slot 78 moves pin 77 outwardly to rock pawl nose 80 of pawl 76 into engagement with a tooth 81 of member 82. The engagement of pawl 76 with member 82 connects the latter to lever 71 for common movement. Pawl 76, in effect, provides a releasable driving connection or coupling between lever 71 and member 82 and when the pawl is engaged with member 82, movement of lever 71 is transmitted by the coupling or driving connection, pawl 76, to the recording devices to be described and of which member 82 forms a part.

Energization of magnet 88 results, as described, from engagement of feeler 74 with a selected contact point 61. When feeler 74 engages the contact point 61, pawl nose 80 is directly over the notch between teeth 81 which corresponds to the digit represented by the contact point. As lever 71 continues in motion while pawl nose 80 is moving towards the aforesaid notch, the pawl nose may pass the correct notch and engage in the succeeding notch. To prevent this and at the same time permit the pawl 76 to pick up the member 82 smoothly, the latter is given a clockwise movement in the same direction as lever 71 while the pawl nose 80 is moving towards teeth 81.

This movement is imparted to member 82 as follows: While member 79 is moving outwardly to rock pawl nose 80 towards teeth 81, the walls of an inclined slot 90 in the member 79 cammingly coact with a pin 91 on member 82 to move the member 82 clockwise. Member 82 is now coupled by pawl 76 to lever 71 and continues to move clockwise with the lever. Pin 91 moves along the arcuate edge 92 of member 79 to positively retain the latter against inward movement during the remainder of the clockwise movement of lever 71, thus preventing breaking of the coupling between lever 71 and member 82.

Member 82 is formed integral with a rack segment 94 meshed with rack teeth 95 on a slidable bar 96. The upper edge of bar 96 is formed with teeth 97 meshed with teeth 98 of a type wheel 99.

The wheel 99 has type formed on the top of each tooth, the type being in successive order, N (representing neutral position), 0, 1, 2, 3, ... 9. Initially type N is at printing position below the hammer tip 100 of a pivoted hammer 101.

Contact points 61 are arranged in descending order to correspond to digits 9, 8, 7, 6, ... 0, as indicated in Fig. 5. If the first contact point corresponding to digit 9 is the selected live spot, the member 82 will begin moving clockwise when feeler 74 engages the 9 spot and will continue moving with lever 71 until pin 77 contacts the lower end wall of slot 78 of member 79 and terminates the forward stroke of lever 71. The end of the forward stroke of lever 71 is one step or position past the "0" contact point and is indicated by line A—A in Fig. 2. As the member 82 has started moving when feeler 74 reached the "9" contact point 61 and continues to one position past the "0" point, it will have moved altogether ten steps or positions. This movement is transmitted through rack 94 and teeth 95 to a ten step movement of bar 96 which in turn, through teeth 97 and 98 rotates type wheel 99 ten steps, bringing the "9" type at printing position to print on the record card T located between hammer tip 100 and the type wheel. The card is supported on a die plate 105 below a column of punch pins 106 for perforating the card with a hole designating the load according to the Hollerith system of tabulating data.

There are ten punch pins 106, corresponding to digits 0 to 9. The pins are selected for operation by movement of the bar 96 simultaneously with the positioning of type wheel 99 by the bar. This punch selection is effected by an interposer lug 107 carried by the free end of a flat spring plate 108 pivoted at 109 to an upright 110 provided on bar 96.

A spring 111 between the upright 110 and spring plate 108 normally holds the plate against a stop 112 with interposer lug 107 held clear above the upper ends of the punch pins. When bar 96 has completed its differential movement to the right, the lug 107 will be located above the punch pin 106 corresponding to the selected digit and to the type at the printing position. Impositively locking pawl 114 coacts with notches 115 in bar 96 to retain it in one of its selected positions.

After type wheel 99 and interposer lug 107 are differentially positioned in accordance with the load, the printing and punching operations take place. The means for effecting these operations comprises a cam 120 on shaft 66 which depresses a roller 121 on a lever 122, after the lever 71 and member 82 have completed their forward and clockwise strokes, but before the end of the forward stroke of handle 65 (counterclockwise as viewed in Fig. 2). During the depression of lever 122 by cam 120, the crank pin 68 is moving along a dwell 123 in the slot 69 of lever 71 so that the handle 65 while lever 122 is being depressed is not attempting to move lever 71 to disturb the selection of the printing and punching elements.

Lever 122 when depressed by cam 120, through a link 125 lowers a slidable member 126 which has a plate 127 at its upper end overlying the interposer lug 107, thereby depressing the lug and causing it in turn to depress the selected punch pin 106 to perforate the card T. Member 126 has a horizontal projection 128 (Fig. 6) above a pin 129 on the pivoted hammer 101 so that on member 126 moving down, the projection 128 depresses the hammer 101 to cause the hammer tip 100 to strike the card T above the selected type of wheel 99 thereby printing the load digit on the card in line with the column including the perforation in the card.

After the printing and punching operations, the handle 65 is moved clockwise through its return stroke, thereby rocking lever 71 counterclockwise, which through the pawl 76 also returns member 82 counterclockwise. Member 82, in turn, restores the printing and punching elements to starting positions. As member 82 moves counterclockwise, pin 91 reaches slot 90 in member 79 and cams the member 79 to the left to replace its pin 84 behind armature pawl 86. The parts are now in starting position.

Preferably, a graphic recorder is coupled with the recording unit just described to provide a graph record of the load and its variations, being particularly useful with continuous flow or hopper feed scales.

The graphic recorder comprises a pulley 135 fast to the back of member 82 to move rigidly therewith. Pulley 135 is connected by cable 136 to a pulley 137 fixed to shaft 138 which carries an angular bracket 139 to which is pivoted a counterbalancing sleeve holder 140 for a stylus 141. The rear end of the stylus is bent down to move in a damping and inking device 142 while the front end contacts graph sheet 143, suitably fed by suitable means as by a clock motor (not shown).

When the member 82 is moved on its return stroke, a spiral spring 145 connected to shaft 138 returns the shaft and stylus 141 to starting position.

To summarize the operation of the device briefly; a load of, say 295 pounds, is applied to the scale, moving conductive strip 12 into radial alinement with the radial bar 13 at the 295 pound position. Push button 35 is now depressed, but has no effect until the scale comes to rest under the load to close equilibrium-sensing switch 34. To avoid unnecessary repetition, the recording of the load value only in the units order will be explained.

When switch 34 closes, the push button becomes effective to close high tension circuits through the common ring 14, strip 12, radial bar 13 at the 295 pound position, and through band 16 corresponding to the "5" value in the units order, to energize high tension magnets 52 connected to said band. The magnet 52 operates armature 54 to close upper and lower contacts 55 and 56, respectively, to energize low tension magnets 57 for maintaining these contacts closed. Contacts 56 select the contact points 61 which are to govern operation of the recorder. Thus, contact 61 marked "5" in the units order (Fig. 5) is selected. Handle 65 of the recorder is now operated without causing movement of the recorder until in the units order the live spot 61 is engaged by feeler 74, whereupon magnet 88 is energized to couple the member 82 to the handle operated lever 71 for a differential movement to line A—A near the end of the forward stroke of the handle 65. Member 82 transmits its movement to type wheel 99, punch interposer 107, and stylus 141. The cam 120 operates at the end of the forward stroke of handle 65 to cause printing and punching of the unit order load value "5" while stylus 141 has, in the units order, graphically indicated "5" on the graph paper 143.

The term "recorder" used herein embraces one or more of the graph marking, the number printing, and the card punching mechanisms. The wheel 99 of the recorder may be termed an "entry-receiving device" for receiving a load value entry. The term "exhibiting or representing means" is used herein as a broad designation of the recorder and covers equivalent means for representing a load value whether in printed or other form. The following claims may interchangeably employ either one of such terms in order to cover variations and changes due to mechanical skill.

What is claimed is as follows:

1. In combination, a driven element, an actuator for the driven element including a coupling normally released from the element, means for causing the coupling to drivingly connect the driven element to the actuator for a differential operation thereby, differential means for determining the extent of said differential operation, and means controlled by the differential means for setting the driven element in motion in the same direction as the actuator just prior to the coupling taking effect thereon to cause the pick-up of the driven element by the actuator to be effected smoothly.

2. In combination a driven device, an actuator therefor having a predetermined cyclical movement, a coupling between the actuator and device, a movable latch for normally holding the coupling released from the device, a magnet operable at any of differential points of said cyclical movement for tripping said latch to cause the coupling to drivingly connect the device to the actuator for differential actuation to the end of said movement, a circuit for said magnet, and differential electrical means for controlling said circuit to automatically and selectively determine the point of said cyclical movement at which the latch is tripped.

3. In combination; a driven element, an actuator therefor, means for coupling the element to the actuator including a device operable to render the coupling means effective for drivingly connecting the element and actuator, differential means for controlling operation of said device to render the coupling means effective during the movement of the actuator, and coacting means on the device and the driven element effective, when the device is operated to render the coupling means effective, for setting the driven element in motion in the same direction as the actuator motion prior to the coupling means taking effect.

4. The combination as defined in claim 3, and the aforesaid coacting means including a cam on the device and a cam follower member on the driven element.

5. In combination; a driven element, an actuator therefor, a releasable coupling for drivingly connecting the element to the actuator, a movable device movable to render the coupling effective to drivingly connect the element to the actuator, differential means for causing movement of the device to render the coupling effective for drivingly connecting the element to the actuator at a differential point of the movement of the actuator, and means on the device and driven element coacting after the differential actuation of the element for moving the device to a position for restoring the coupling to ineffective coupling condition.

EDWARD J. VON PEIN.